Sept. 22, 1959  E. A. MULROONEY, JR  2,904,830
AIR RELIEF VALVE FOR A PLASTICS EXTRUSION RAM
Filed July 26, 1957
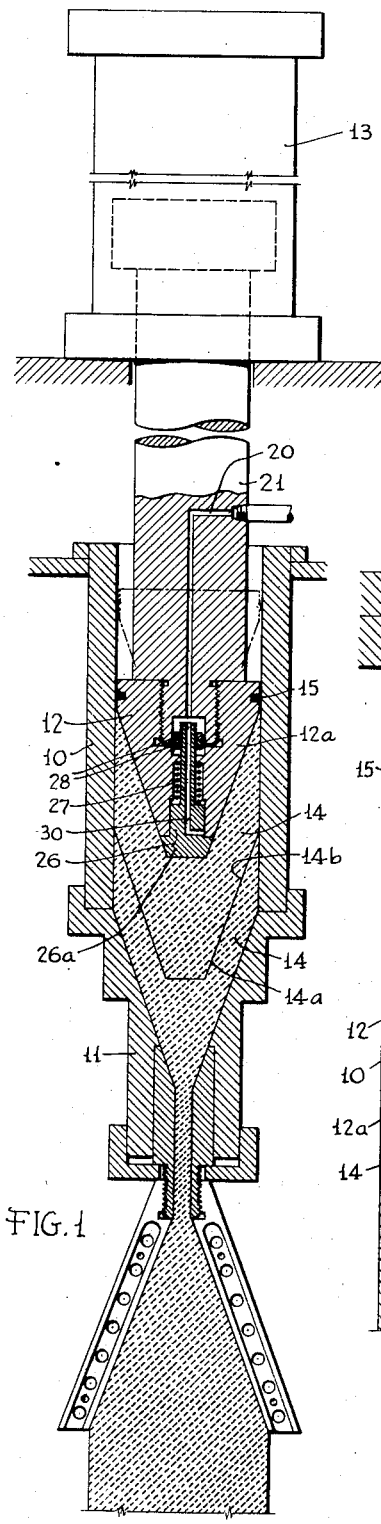
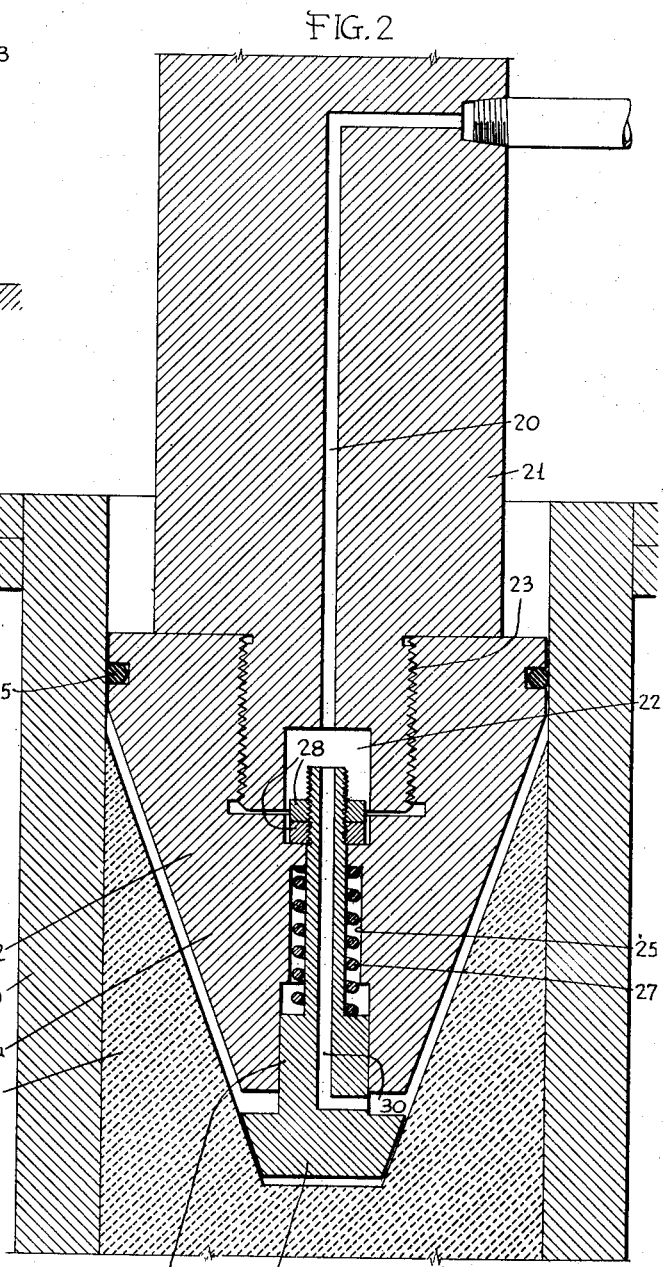
INVENTOR
Edward A. Mulrooney, Jr.
BY
Wm. R. Glisson
ATTORNEY

United States Patent Office 2,904,830
Patented Sept. 22, 1959

2,904,830

AIR RELIEF VALVE FOR A PLASTICS EXTRUSION RAM

Edward A. Mulrooney, Jr., New Castle, Del., assignor to Continental-Diamond Fibre Corp., Newark, Del., a corporation of Delaware Application July 26, 1957, Serial No. 674,464

1 Claim. (Cl. 18—12)

This invention relates to an air relief valve for a plastics extrusion ram and has for an object the provision of improvements in this art. The term "air relief" herein refers both to the removal of compressed air from the space between the ram and the material in the extrusion cylinder or pot during the start of extrusion and to the admission of air into the space between the ram and the material to relieve the vacuum when the ram is withdrawn to permit the introduction of a new charge of material.

The invention has been developed in connection with the extrusion of flocculated aqueous colloidal dispersions of polymerized unsintered polytetrafluoroethylene and a lubricant, extrusion aid, or plasticizer. For brevity of reference polytetrafluoroethylene, which in America is known under the trade name of "Teflon" and in England as "Fluon," and which often has been called the "noble plastic" because of its extreme resistance to attack by most known reagents, will at times be designated as "Teflon."

"Teflon" does not melt when heated like most plastics but becomes viscous so it cannot be extruded in the liquid state. However, a process has been introduced by prior workers in the art for extruding the flocculated unsintered material in admixture with plasticizing agents (light hydrocarbon oils etc.) which are later removed by evaporation, absorption or other methods before or during the subsequent sintering or curing of the material.

This plastic mixture can be extruded into continuous coherent strip form if it is first fully freed from included air. One method comprises the steps of preliminarily forming compact coherent slugs, billets or inserts in a press and introducing these inserts into the extrusion cylinder. In order to obtain full overlap and continuity of the extruded strip the preforms are made conical at their ends, the conical projection at one end fitting the conical recess at the other end of an adjacent insert. The inserts or slugs are made with a slightly smaller diameter than the cylinder so that when the ram is retracted from the cylinder air can freely escape from between the slugs as they are charged into the cylinder. The ram, however, must exert great pressure and must fit tightly in the cylinder, as at a packing ring, so as to prevent escape of material. The ram also has a conical end projection to fit in the conical recess of the uppermost slug to preserve its shape for the next slug which is inserted.

It will be seen, therefore, that air is trapped below the ram after it enters the cylinder and if this air is not fully removed before the start of extrusion it will be forced into the plastic material to form air bubbles and flaws in the extruded strip.

The present invention provides improved means in association with the ram for relieving compressed or vacuum gas conditions below the ram. One embodiment of the invention will be described in connection with the accompanying drawings thereof, wherein:

Fig. 1 is a vertical axial section through an extrusion device embodying the invention; and Fig. 2 is an enlarged section and elevation through the ram alone.

The apparatus with which the present invention is shown to be embodied comprises an extrusion cylinder or pot 10 having extrusion dies generally referred to by the numeral 11, a ram or plunger 12 for forcing the plastic material through the dies, and a power device in the form of a cylinder-piston unit 13 for operating the ram. The power unit may be operated by hydraulic pressure.

The plastic material to be extruded is introduced into the pot or cylinder in the form of inserts, charges, slugs or billets 14 which are in coherent form substantially free from entrapped air. They are formed to fit very closely in the cylinder but with a very slight clearance to allow air to escape upward past them as they are charged and as compression starts. They have conical projections 14a at the lower end and fitting conical recesses 14b at the upper end. As stated, the billets may be formed from particulate material with an extrusion aid in a preliminary pressing operation. This is particularly useful with "Teflon."

The ram or plunger 12 is formed with a conical projection 12a on its lower end or head to fit the conical recess in the upper end of the last billet which is charged into the cylinder while the ram is completely withdrawn above the cylinder.

The ram is provided with a sealing O-ring 15, as of "neoprene" or the like in a groove, for preventing the upward flow of plastic material along the sides of the ram. The ram itself has only a very slight clearance in the cylinder.

It will be seen that the arrangement is such that air will be trapped below the ram when the ram is brought down on the charge, and this is especially true because the conical ram end enters a conical recess in the upper end of the charge. If air is entrapped it will be forced into the soft plastic material to spoil the extruded strip. Likewise when the ram starts to withdraw, the high vacuum which is created must be relieved or the charge will be urged upward, either as a whole or in fragments which break off. Either would be very harmful to subsequent operations and produce flaws in the extruded strip.

To provide this relief of compression and vacuum the ram is provided with venting means which operate automatically in either direction of movement of the ram.

As shown, a vent channel 20 is provided in the plunger rod 21 of the ram head proper which fits in the cylinder. The channel extends axially from a chamber 22 in the end of the plunger rod and turns laterally to open to the side of the rod. A threaded socket is shown for attachment of an air filter or tube connections if desired but it is not necessary to consider such means herein. The plunger rod is screw-threaded at 23 to the ram head with gaskets or other seals or locking means if wanted.

The ram head 12 is formed with a stepped axial bore 25 to receive the two-sized cylindrical stem portions of a vent tip 26 having a head 26a. A compression spring 27 is placed in one of the stepped portions of the bore 25 to strongly urge the vent tip outward or downward in the bore. Nuts 28 retain the stem of the tip against undue outward movement by the spring.

A vent channel 30 in the tip 26 has an axial portion opening into the chamber 22 and a laterally extending portion opening to the side of the larger diameter portion of the stem behind the head 26a.

When the tip is protruded by the spring the vent channels 20 and 30 form a clear passage for air in either direction through the ram and when the tip is pressed back against the end of the ram head the vent passage is closed. In its retracted position the outer surface of the tip head forms a smooth continuation of the outer conical surface of the ram head end but has a flat end portion to create pressure for pushing the tip head back against the strong spring. When the tip is pushed back the space between it and the ram head is fully closed and no plastic material can enter during extrusion.

In operation, except when the ram head is pressed tight against the plastic charge, the spring keeps the vent tip distended as far as possible and air is free to pass either out or in, depending on the direction of movement of the ram.

It is thus seen that the invention provides simple and effective means for venting compression space beneath a ram.

While one embodiment of the invention has been described for purposes of illustration it is to be understood that there may be various embodiments and modifications within the general scope of the invention.

What is claimed is:

Apparatus for extruding slugs of plastic material having a cylindrical side, a frusto-conical forward end projection, and a frusto-conical cavity in the rear end of the same size and taper as the forward end projection, comprising in combination, an extrusion pot or container having a cylindrical portion and a forward extrusion die portion of a shape to fit the frusto-conical portion of the slugs, an extrusion plunger operable in said pot to extrude plastic material through the die portion, said plunger having a cylindrical portion closely fitting in the cylindrical portion of the pot with a sealing ring at the upper end fitting tightly in the pot, said plunger also having a forward frusto-conical end portion fitting in the cavity of a slug, said plunger also having a central vent cavity extending therethrough, a vent tip having a stem reciprocably mounted in a cavity in the forward end of the plunger and having a frusto-conical head which fits the bottom of a slug cavity, a spring urging said vent tip forward from said plunger, and means retaining the tip on the plunger, said tip head having a flat rear portion to fit the flat end of the frusto-conical forward end portion of the plunger, and said tip stem having a vent channel along its length opening on the side behind said head for venting through the plunger when the head is extended and closing when the head is pushed back against the end of the plunger, the head when pushed back against the plunger forming on its conical sides a smooth continuation of the conical sides of the forward frusto-conical end portion of the plunger.

References Cited in the file of this patent

UNITED STATES PATENTS

| | | |
|---|---|---|
| 1,826,945 | McKay et al. | Oct. 13, 1931 |
| 1,943,477 | Haserodt | Jan. 16, 1934 |
| 2,332,211 | Field | Oct. 19, 1943 |